United States Patent

[11] 3,631,475

| [72] | Inventors | Gerhard Quandt<br>Heidelberg;<br>Hans-Christian Muller, Waldhilsbach, both of Germany |
| --- | --- | --- |
| [21] | Appl. No. | 882,596 |
| [22] | Filed | Dec. 5, 1969 |
| [45] | Patented | Dec. 28, 1971 |
| [73] | Assignee | Feldix G.m.b.H.<br>Heidelberg, Germany |
| [32] | Priorities | May 24, 1969 |
| [33] | | Germany |
| [31] | | P 19 26 734.6;<br>May 24, 1969, Germany, No. P 19 26 733.5 |

[54] ELECTROMECHANICAL INDICATOR DEVICE
10 Claims, 6 Drawing Figs.

[52] U.S. Cl. .................................................. 340/366,
310/15 B
[51] Int. Cl. ................................................. G08b 5/24,
H02k 21/16
[50] Field of Search ........................................... 340/366,
378, 381; 310/49, 156; 318/696, 685; 116/115

[56] References Cited
UNITED STATES PATENTS

| 2,433,608 | 12/1947 | Handley | 310/49 |
| --- | --- | --- | --- |
| 3,344,325 | 9/1967 | Sklaroff | 310/49 |
| 3,240,965 | 3/1966 | Casey | 340/378 |
| 3,482,126 | 12/1969 | Bradley | 340/378 |
| 3,508,256 | 4/1970 | Dudley et al. | 340/366 |

*Primary Examiner*—Robert L. Griffin
*Assistant Examiner*—John C. Martin
*Attorney*—Spencer & Kaye ABSTRACT: An electromechanical rotary indicating device for selectively displaying a plurality of symbols having a cylindrical permanent magnet rotor, to which a symbol-carrying member is coupled, which is selectively deflectable to a plurality of discrete angularly spaced positions by selective energization of the excitation coils or windings placed on the pole pieces of the stator. The periphery or surface of the rotor is provided with a plurality of longitudinal or axial grooves which are arranged asymmetrically with respect to the direction of the magnetic field in the rotor, which direction is transverse to the axis of rotation of the rotor.

INVENTORS
Gerhardt Quandt &
Hans-Christian Müller

BY Spencer & Kaye
ATTORNEYS

INVENTORS
Gerhardt Quandt &
Hans-Christian Müller

BY Spencer & Kaye
ATTORNEYS

ELECTROMECHANICAL INDICATOR DEVICE

BACKGROUND OF THE INVENTION

The present invention relates to an electromechanic indicating device consisting of a stator with a plurality of magnetizable poles with respective excitation windings or coils disposed thereon, and a rotor, in the form of a permanent magnet and rotatably mounted between the poles, to which is connected a carrier arrangement provided with the symbols to be indicated.

Such indicating devices have been used in aircraft computers or other electronic systems as miniature modules to indicate numbers, symbols or the like. Typical examples of such indicators are shown in U.S. Pats. Nos. 3,311,911 and 3,350,709.

Both of these U.S. Pats. teach that care must be taken with such electromechanical indicating devices so that sequential actuation of the circuitry to cause the indication of two symbols which are diametrically opposed on the surface of the carrier arrangement, the second symbol actuated is actually indicated, and that the rotor does not stop in its labile position. In order to eliminate these problems, U.S. Pat. No. 3,311,911 provides additional small auxiliary windings on the individual radial poles of the stator. When a main winding is actuated, the current flowing through this main winding is also conducted through the auxiliary winding of the adjacent pole. This causes the rotor, which is a magnet, to set itself, when a main winding is excited, not in the direction of the axis of the associated stator pole, but in a direction which is rotated by a slight amount with respect to this direction. When the current through the windings is eliminated, the magnet rotor sets itself in such a manner that its magnetization direction coincides with the pole axis whose associated excitation winding has just been excited. After discontinuation of the current, the magnet rotor thus sets itself in the direction into which it would have set itself if there had been no auxiliary winding on the adjacent pole when the main winding was excited.

The rotor setting resulting after discontinuance of the excitation current deviates by a given angular amount from the position where a labile position would exist when the indicator is energized to indicate the next directly diametrally opposite symbol. Thus it is assured that for each new actuation or energization the desired symbol is indicated. The drawback of this arrangement is that additional smaller auxiliary windings are required in addition to the main windings. The use of additional windings which are also different from the main windings makes the electromechanical indicating device more expensive.

U.S. Pat. No. 3,350,709 attempts to overcome the above problems by modification of the rotor instead of utilizing the additional auxiliary windings. According to this patent the north and south poles of the rotor are not diametrally opposite one another but are offset by a small angle, e.g., 15°. This configuration also causes the rotor to set itself in a somewhat different position after the excitation current is cut off. Thus it is assured that when the diametrally opposite symbol is actuated, it is brought to the indication position without the danger of an error indication existing. In this known arrangement, however, the manufacture of the above-discussed magnet rotor with an angled magnetic field provides difficulties.

Finally, it has also been proposed (German Published Pat. Application No. 1,462,902) to solve the above-mentioned problem by constructing the rotor as an asymmetrical member having two ends or edges which are not diametrically opposed, and to add additional stator poles without windings. The drawback of this known arrangement is the necessity of using additional stator poles which results in an increase in the size of the indicating device.

SUMMARY OF THE INVENTION

It is an object of the present invention to modify the electromechanical indicating devices of the above-described type in such a way that accurate setting of the symbols, even if two diametrically opposite symbols are to be sequentially indicated, becomes possible without requiring additional windings or a magnetization of the rotor which is difficult to realize, thereby involving even less expense.

According to the present invention this problem is solved in an electromechanical indicating device of the type including a stator having a plurality of magnetizable pole pieces having respective excitation coils thereon, a permanent magnet rotor mounted between said pole pieces for rotation about an axis transverse to the direction of magnetization of the rotor and selectively deflectable to a plurality of discrete angularly displaced positions, and an indicia carrier having thereon the symbols to be indicated and coupled to the rotor for rotation therewith, by providing the peripheral surface of the permanent magnet rotor, at least in the vicinity of the magnetic poles thereof, with a plurality of longitudinal or axial grooves which are asymmetrical with respect to the magnetic field lines of the rotor.

Accordingly, in the electromechanical indicating device according to the present invention it is only necessary, to solve the above-mentioned problem, that the rotor be provided with longitudinal grooves which pose no difficulties in the manufacturing process. With respect to the magnetization of the rotor, the present invention does not pose any special requirement, other than the easily met requirement that the groove distribution and the magnetization direction of the rotor have a certain relationship with one another.

In the German Pat. Application Ser. No. P 18 13 121.0 corresponding to copending U.S. pat. Application Ser. No. 882,595, filed Dec. 5, 1969 by W. Fessler and H. Leiber for an Electromechanical Indicating Device, which is assigned to the same assignee as this application, it has been proposed to provide the rotor of the indicating device with longitudinal grooves. In that application the longitudinal grooves are provided for the purpose of effecting a locked setting of the rotor. In the indicating device according to the present invention, the grooves also effect a definite setting of the individual symbols. The combination of the longitudinal grooves with their asymmetrical relationship to the rotor poles, however, produces the additional effect in the device according to the present invention that, when diametrally opposite symbols are selectively actuated, the rotor can not stop in its labile position.

According to a further development of the present invention, the entire rotor periphery is provided with a uniform distribution of longitudinal grooves, the number of which corresponds with the number of possible symbols to be indicated. This feature results in a particularly accurate setting of the symbols. In order to insure that the longitudinal grooves do not cause the torque required for the transition to the indication of the next symbol to be increased too greatly, the present invention provides that the longitudinal grooves extend over only a portion of the rotor height or length and/or that the groove depth changes along the length of the grooves.

According to a preferred embodiment, the longitudinal grooves begin at one of the rotor frontal faces or ends with a given groove depth, and end with a continuously decreasing groove depth approximately at half the height of the rotor. According to another embodiment, the rotor may be composed of two cylindrical portions having the same diameter where grooves are applied to only one of the two rotor portions. In this case, the groove depth changes suddenly, for example, at approximately half the height of the rotor.

The fabrication of the rotor according to the present invention does not pose any difficulties because the rotor including the grooves can be produced in one operation, e.g., a pressing operation. In such an operation the material to be pressed can be a mixture, for example, of a magnetizable powder, e.g., iron oxide, and a binder. The binders are preferably of the hardening plastic type, e.g., the so-called Duroplast. It has proven to be advantageous in practical tests to magnetize the rotor so that the magnetic field passes through one of the pole-type protrusions disposed between each two adjacent grooves.

DESCRIPTION OF THE PREFERRED EMBODIMENT

Figure 1:
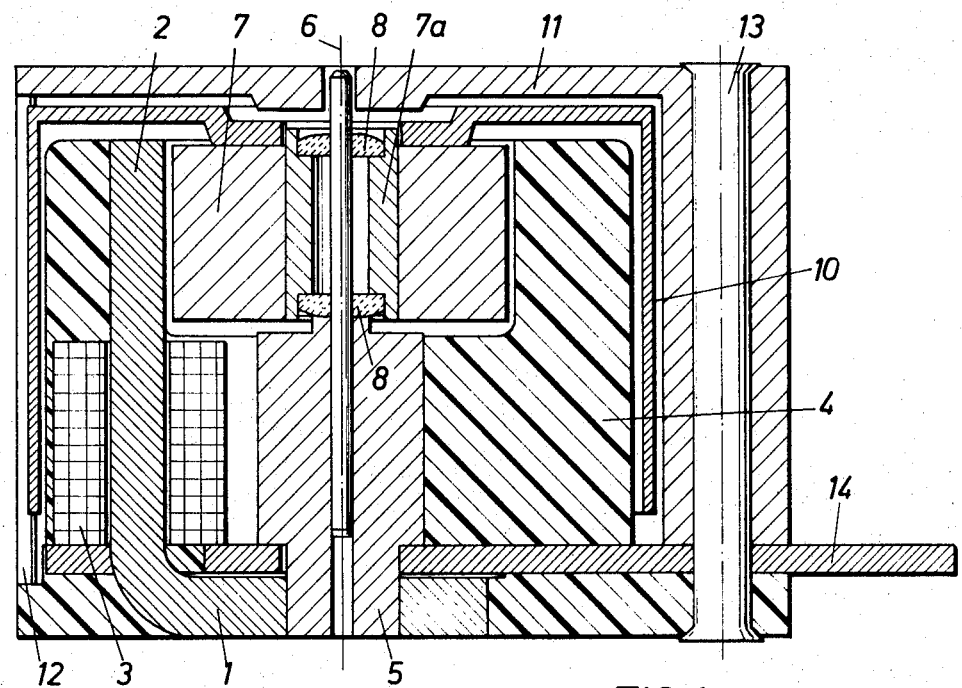
FIG. 1 is a sectional view of an electromechanical indicating device containing a rotor modified according to the invention.
Figure 2:
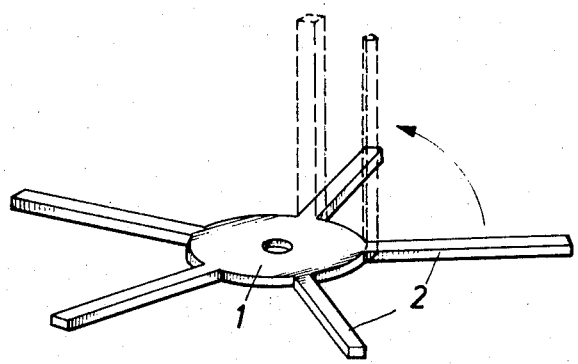
FIG. 2 is an isometric view of a stator element for the electromechanical indicating device of FIG. 1, illustrating the manner in which the stator is formed.

Referring now to FIGS. 1 and 2, there is shown an indicating device of the type with which this invention is concerned. The particular arrangement illustrated is disclosed in the above identified copending U.S. Pat. application and has the advantage over the other known devices of ease in manufacture and of exhibiting a low rotor inertial moment.

As shown in FIG. 1 the electromechanical indicating device has a stator with a bottom portion 1 and a plurality of vertical pole pieces 2, (only one of which is illustrated in the Figure) which are connected together at their lower ends by means of the portion 1. Preferably the stator is formed by cutting a single piece of magnetizable material into the shape shown in FIG. 2. Although five pole pieces 2 are illustrated, it is understood that this is by way of example only and that more or less pole pieces may be utilized depending on the number of symbols to be indicated. Final construction of the stator is achieved by bending the pole pieces at an angle of approximately 90° to the position shown by the dashed lines in FIG. 2. Axially mounted on each of the pole pieces 2 is a separate excitation coil or winding 3 having their leads connected to a printed circuit board 14. As illustrated the stator including bottom portion 1 and pole pieces 2, together with the plurality of coils 3 thereon, and a portion of the circuit board 14 are embedded in a circular block of cast resin material 4. Supported within the central recess of the block of cast resin 4 by means of a brass bolt 5 is a stationary axle 6 which is parallel to the axes of the pole pieces 2 and the excitation coils 3. The axle 6 supports and forms the axis of rotation of a permanent magnet rotor 7 which is magnetized in a direction transverse to the axle 6. In order to obtain movement of the rotor 7 with as little friction as possible, the rotor 7 is supported on the axle 6 by means of a pair of jeweled bearings 8 mounted in a bearing box 7a which forms a yoke for the rotor.

Connected to the rotor 7, and extending over the outer circumference of the block of encapsulating material 4, and hence essentially surrounding the entire magnetic system including the pole pieces 2, is a symbol carrier or cover 10. Formed on the outer surface of the cover 10, which preferably as illustrated is of cylindrical shape, are the symbols to be indicated. The symbols may be formed thereon by any convenient method, for example by painting or the like. In order to complete the device, an upper housing portion 11 having a window 12 for displaying the selected symbol is fastened to the cast resin element 4, for example, by means of a rivet 13.

In order to position the rotor, the control circuitry for selectively actuating the excitation coils 3 is connected to the protruding portion of the circuit board 14 either by soldering or by means of plug-type connectors. Although the indicating device according to the invention can be utilized with the conventional-type circuitry generally associated with this type of indicating device whereby one or two coils are energized to selectively position the rotor, preferably circuitry is used which simultaneously energizes two or three adjacent coils. By selectively actuating three adjacent excitation coils 3, the rotor 7 may be positioned in five different discrete angularly spaced positions, i.e., with the magnetic field pole thereof facing one of the five stator pole pieces. Thus, five different symbols which are spaced about the surface of the cover 10 will selectively become visible in the window 12 of the upper housing portion 11. Additionally, selective actuation of two adjacent excitation coils 3 will cause the rotor 7 to rotate to five different angularly displaced positions which are located intermediate to the pole pieces 2; thus enabling the indication of five additional symbols on the cover 10.

The concept of the present invention will now be explained in detail with the aid of the embodiment of FIG. 3 wherein only the five poles 15 of the stator are illustrated. Since the illustrated electromechanical indicating device is intended to indicate 10 different symbols, e.g., 10 numbers, the rotor 16 is provided with 10 grooves 17, i.e., the same as the number of possible positions, and thereby forming rotor poles 18 between the grooves 17. If the direction of the magnetic field of the rotor were to lie in the direction of the line of symmetry 19, the rotor would rotate, when one or three of the adjacent winding on poles 15 are actuated, into the illustrated association of the rotor poles to the stator poles.

Figure 3:
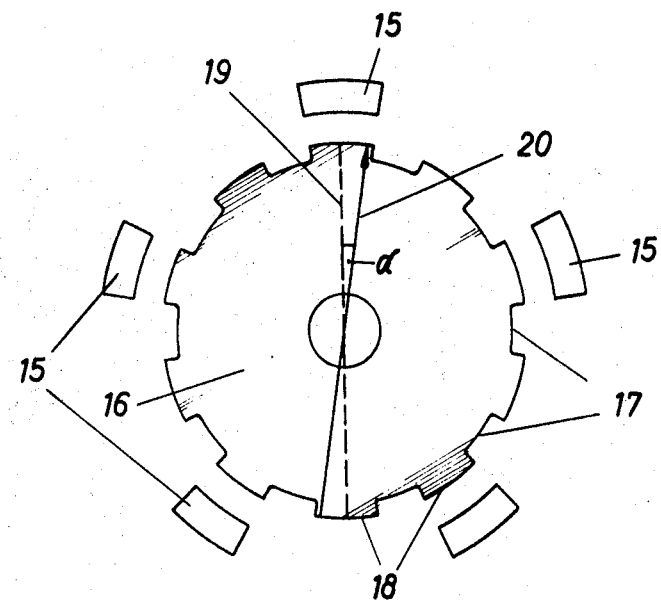
FIG. 3 is a schematic plan view illustrating the relationship between the stator pole pieces and a rotor according to the invention.

However, as shown in FIG. 3, the magnetic field lines of the rotor, as indicated by arrow 20, are rotated with respect to the direction of the line of symmetry 19 by the angle $\alpha$ (approximately 7°). Due to this angular displacement, the rotor 16 rotates, when the winding associated with the uppermost pole 15 in the drawing is energized to a position which is angularly displaced from that shown by a small angular amount $\beta$, in counterclockwise direction. When the excitation current is cut off, the angular displacement of the magnetic field causes the rotor to be rotated by a small angular amount with respect to the excited state. This small angular rotation is sufficient, however, to prevent the rotor from remaining in its labile position when the diametrally opposite symbol is subsequently actuated. When the coil of the uppermost pole and the coil of the pole adjacent thereto are actuated, the rotor sets itself into a position which is offset by $\beta \pm 36°$ with respect to the illustrated position.

Figure 4A:
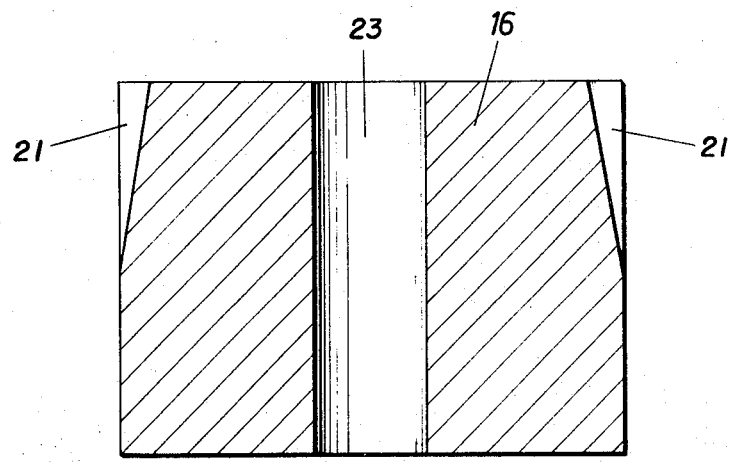
FIGS. 4a and 4b are sectional and plan views respectively of a preferred embodiment of a rotor according to the invention.
Figure 4B:
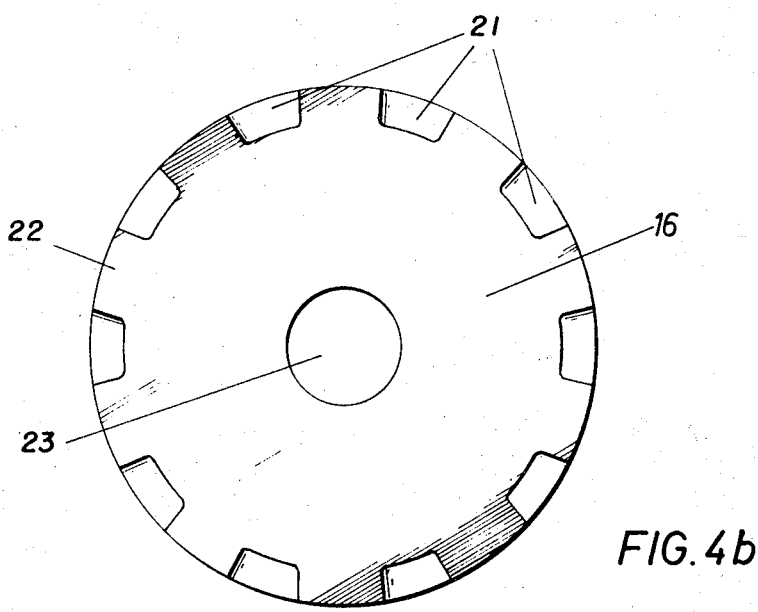

FIGS. 4a and 4b show an embodiment according to a further improvement of the rotor according to the present invention, FIG. 4a being a sectional view, and FIG. 4b showing a plan view of a frontal face or end of the rotor, which in this Figure is also marked 16. The grooves 21 formed on the peripheral surface of the rotor member 16, however, exhibit a different configuration, than the grooves 17 of the above-discussed FIG. 3. As is shown in FIGS. 4a and 4b, the grooves 21 do not extend over the entire height of the rotor 16, but only to about half its height. Moreover, in the course of the grooves 21 along the rotor, the depth thereof continuously changes so that the grooves have their greatest depth at the upper frontal face of the rotor of FIG. 4a and end, with continuously decreasing depth, approximately at the center of the rotor. Protrusions 22 disposed between two adjacent grooves form the rotor poles mentioned above. The central bore of the rotor bears the reference numeral 23.

The extension of the grooves 21 only over a portion of the rotor height and/or the variation of the groove depth along the course of the groove path as shown in FIGS. 4a and 4b result in a reduction of the torque required to rotate the rotor. In spite of this, the advantage resulting from the presence of the grooves, i.e., that the rotor can be accurately set in every possible rotor position, is maintained.

Figure 5:
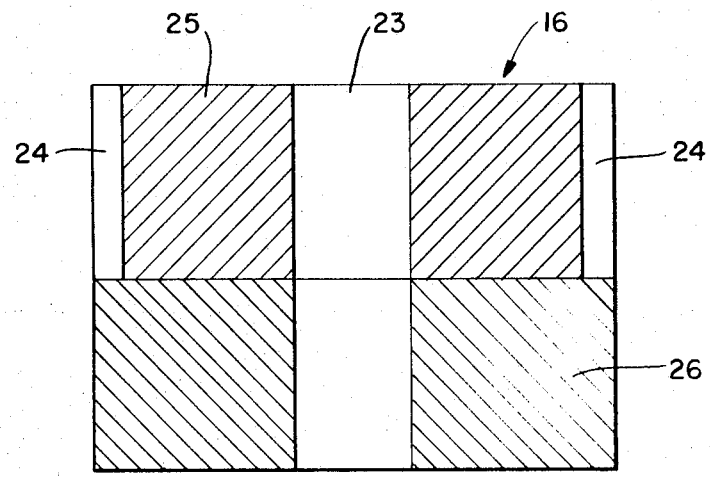
FIG. 5 is a sectional view of another embodiment of a rotor according to the invention.

FIG. 5 shows a modification of the rotor 16 of FIGS. 4a and 4b. While, as shown, the grooves 24 still extend over only one-half the length or height of the rotor 16, instead of having a continuously varying depth, the grooves 24 are of substantially uniform depth resulting in a sudden or abrupt change in the depth at the lower end thereof. For ease in manufacture, as shown, the rotor is preferably formed from two substantially identical cylindrical portions 25 and 26, with the portion 25 being provided with the grooves 24 on the surface thereof and the portion 26 having a uniform surface.

Throughout the application it is stated, that the pole pieces 2 and the bottom portion 1 of the stator are formed of "magnetizable material." This term is understood to mean, that the pole pieces 2 and the bottom portion 1 of the stator are formed either of soft iron or similar material or of a ferromagnetic material, which has a small remanence and not of a material similar to the material of the rotor 7, which is characterized by a high remanence.

It will be understood that the above description of the present invention is susceptible to various modifications, changes and adaptations, and the same are intended to be comprehended within the meaning and range of equivalents of the appended claims.

We claim:

1. In an electromechanical rotary indicating device for selectively displaying a plurality of symbols in response to electrical energization, said indicating device being of the type including a stator having a plurality of magnetizable pole pieces having respective excitation windings thereon, a cylindrical permanent magnet rotor/rotatably mounted between said pole pieces for deflection about an axis transverse to the direction of magnetization of said rotor to a plurality of discrete angularly spaced positions, and a carrier having thereon the symbols to be indicated and coupled to said rotor, the improvement that said rotor is provided in its periphery, at least in the portion thereof adjacent to the magnetic poles, with a plurality of longitudinal grooves which are substantially parallel to the rotor axis and which define a plurality of rotor poles therebetween, said direction of magnetization of said rotor passing through at least one of said rotor poles and being rotated by a small angle with respect to a line of symmetry for said rotor passing through said at least one of said rotor poles whereby said plurality of longitudinal grooves are arranged asymmetrically with respect to said direction of magnetization of said rotor.

2. The electromechanical indicating device defined in claim 1, wherein said longitudinal grooves are equal in number to the number of said discrete angularly spaced positions, and are uniformly distributed about the periphery of said rotor.

3. The electromechanical indicating device defined in claim 2 wherein said longitudinal grooves extend over only a portion of the cylindrical surface of said rotor.

4. The electromechanical indicating device defined in claim 3 wherein the depth of said longitudinal grooves changes abruptly.

5. The electromechanical indicating device defined in claim 2 wherein the depth of said longitudinal grooves change along the length thereof.

6. The electromechanical indicating device defined in claim 3 wherein said longitudinal grooves extend from one end of said rotor for approximately one-half the length thereof with continuously decreasing depth.

7. The electromechanical indicating device defined in claim 3 wherein said rotor is comprised of a compressed mixture of magnetizable powder and a binder.

8. The electromechanical indicating device defined in claim 7 wherein said binder material is a hardening plastic.

9. An electromechanical indicating device as defined in claim 1 wherein said carrier is provided with 10 symbols thereon for selective indication, said stator is provided with five of said pole pieces, and said rotor is provided with 10 of said grooves.

10. An electromechanical indicating device as defined in claim 2 wherein said stator pole pieces are disposed in a plane parallel to the axis of rotation of said rotor and are magnetically connected together at one end thereof, said excitation windings being disposed about said pole pieces with the axes thereof also being parallel to the axis of rotation of said rotor.

* * * * *

UNITED STATES PATENT OFFICE
CERTIFICATE OF CORRECTION

Patent No. 3,631,475                 Dated December 28th, 1971

Inventor(s) Gerhard Quandt and Hans-Christian Muller

It is certified that error appears in the above-identified patent and that said Letters Patent are hereby corrected as shown below:

In the heading of the patent, line 8, change "Feldix" to --Teldix--. Column 5, line 16, after "rotor" delete the slash "/".

Signed and sealed this 26th day of September 1972.

(SEAL)
Attest:

EDWARD M. FLETCHER, JR.                ROBERT GOTTSCHALK
Attesting Officer                      Commissioner of Patents